Figure 1:
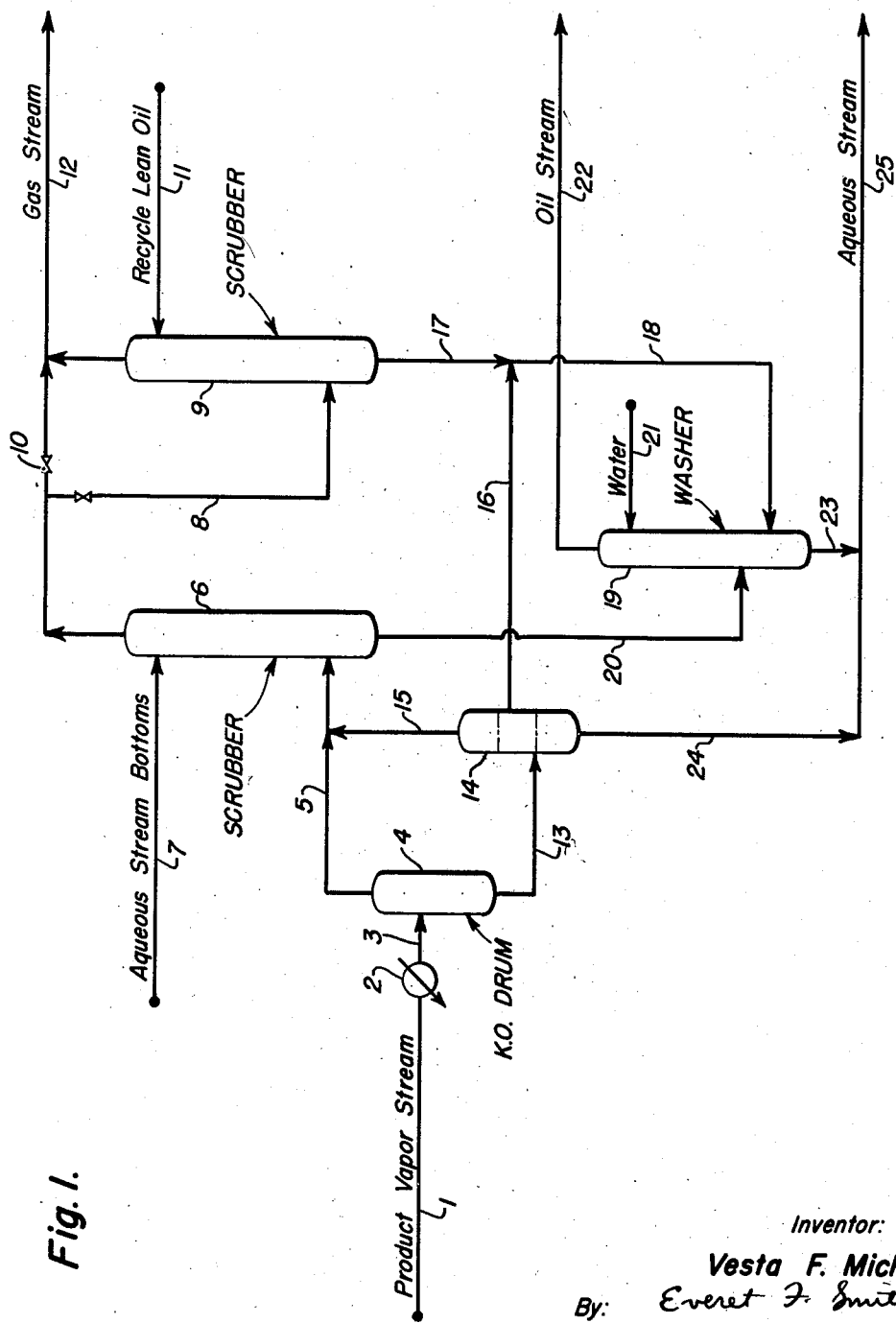

Jan. 13, 1953      V. F. MICHAEL      2,625,560
SEPARATION OF OXYGENATED COMPOUNDS WITH BISULFITE ADDUCTS
Filed Sept. 24, 1947      3 Sheets-Sheet 1

Inventor:
Vesta F. Michael
By: Everet F. Smith
Patent Agent

Jan. 13, 1953 V. F. MICHAEL 2,625,560
SEPARATION OF OXYGENATED COMPOUNDS WITH BISULFITE ADDUCTS
Filed Sept. 24, 1947 3 Sheets-Sheet 2

Inventor:
Vesta F. Michael
By: Everet F. Smith
Patent Agent

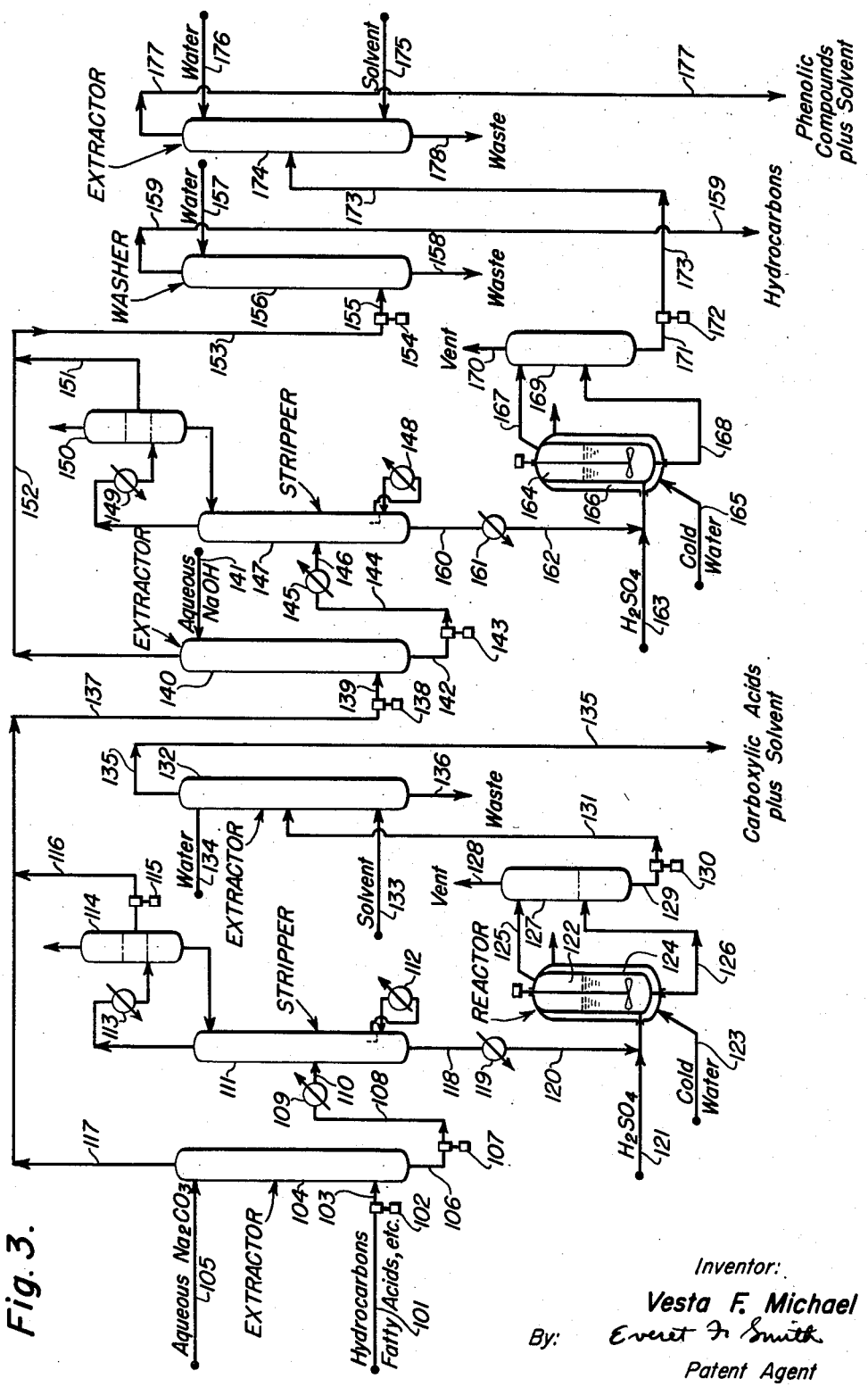

Patented Jan. 13, 1953　　　　　　　　　　　　　　　　　　　　2,625,560

UNITED STATES PATENT OFFICE

2,625,560

SEPARATION OF OXYGENATED COMPOUNDS WITH BISULFITE ADDUCTS

Vesta F. Michael, Tulsa, Okla., assignor to Stanolind Oil and Gas Company, Tulsa, Okla., a corporation of Delaware Application September 24, 1947, Serial No. 775,919

10 Claims. (Cl. 260—450)

This invention relates to the recovery of organic oxygenated compounds from solutions thereof in organic liquids, and more particularly to a method for segregating, separating, and purifying alcohols, aldehydes, ketones, carboxylic acids, and phenolic compounds from mixtures thereof with hydrocarbons.

My invention broadly comprises a novel method for separating alcohols from solutions thereof in organic liquids by extracting the alcohols with an aqueous solution of aldehyde and/or ketone-bisulfite addition products. By means of this step, in combination with other operations as hereinafter set forth, I am able to separate solutions of organic oxygenated compounds into generically dissimilar groups, from which the individual components may then be conveniently isolated.

Numerous methods for preparing organic oxygenated compounds have been devised and reported in the prior art. Many of the methods produce the desired products in substantially pure condition, or in such mixtures that separation is comparatively simple by conventional means. Other methods, however, are less selective, and tend to produce complex mixtures from which the isolation of pure components is exceedingly difficult. For example, the direct oxidation of natural gas or of other hydrocarbon gases is potentially one of the cheapest sources of oxygenated compounds, and the method has therefore been studied extensively. The reaction products, however, are a complex mixture of the theoretically derivable organic oxygenated compounds, the isolation of which has proved to be very difficult. As a further example, the so-called Fischer-Tropsch synthesis, wherein carbon monoxide and hydrogen are reacted in the presence of a suitable catalyst, such as iron or cobalt, produces primarily hydrocarbons, but in addition a small yield of oxygenated compounds.

More recently, a new and improved process for the hydrogenation of carbon monoxide has been developed which permits the use of the fluidized-catalyst technique. The use of this new technique with a catalyst of suitable composition in combination with carefully chosen conditions of temperature, pressure, and space velocity gives not only much greater space-time yields, but also products of a more desirable boiling range and higher octane number. In addition, relatively higher yields of oxygenated compounds are produced.

In one embodiment of the new process, for example, wherein reduced iron catalysts containing around 1% of an alkali-metal compound, such as potassium hydroxide or potassium fluoride, are used to hydrogenate carbon monoxide, a water layer containing up to 15% or more of oxygenated compounds, and a hydrocarbon layer containing up to 40% or more of oxygenated compounds are produced under the following approximate conditions:

Temperature, 600–650° F.
Pressure, 150–300 lbs./in.$^2$, gage
Space velocity, 10–20 cu. ft. CO, measured at 60° F. and one atmosphere, per pound of iron per hour
CO concentration in feed, 10–20% by vol.
H$_2$:CO ratio in feed, 2–8

The two layers have been found to contain the following oxygenated compounds, and others: acetaldehyde, propionaldehyde, acetone, methanol, methyl acetate, butyraldehyde, ethyl acetate, ethyl methyl ketone, ethanol, n-propyl alcohol, methyl n-propyl ketone, n-butyl alcohol, ethyl butyrate, methyl n-butyl ketone, n-pentyl alcohol, n-decyl alcohol, higher aliphatic alcohols, acetic acid, propionic acid, butyric acid, 2-methylbutyric acid, valeric acid, 3-methylvaleric acid, caprylic acid, 2-methylhexanoic acid, capric acid, myristic acid, palmitic acid, stearic acid, phenol, and higher phenols. The hydrocarbons in the product comprise virtually the entire range of saturated and unsaturated hydrocarbons, from dissolved methane to high-melting waxes. The following table illustrates the daily output of the major oxygenated products from a plant employing the new process to produce 6,000 barrels per day (42 gallons per barrel) of gasoline-range hydrocarbons:

*Aqueous phase*

|  | Gal./day |
|---|---|
| Acetaldehyde | 4,247 |
| Propionaldehyde | 873 |
| Acetone | 5,170 |
| Methanol | 333 |
| Butyraldehyde | 1,231 |
| Ethyl methyl ketone | 2,171 |
| Ethanol | 30,322 |
| n-Propyl alcohol | 6,879 |
| n-Butyl alcohol | 2,036 |
| n-Pentyl alcohol | 504 |
| Acetic acid | 8,609 |
| Propionic acid | 3,217 |
| Butyric acid | 1,579 |

*Hydrocarbon phase*

| | |
|---|---:|
| Aldehydes and ketones | 3,964 |
| Alcohols | 4,492 |
| Acids | 3,629 |

It will be obvious to those skilled in the art that the isolation of individual components from such a complex mixture would be exceedingly difficult by any known methods. Simple, direct, fractional distillation of either the hydrocarbon phase or the aqueous phase is not feasible because of the numerous multiple-component azeotropes that are known to exist among the various constituents, and because of the tendency of certain of the compounds to react, decompose, or polymerize when such a mixture is exposed to elevated temperatures for considerable periods of time. Moreover, the literature discloses no selective solvent or solvents capable of effecting the separation of such mixtures into the individual components.

In this situation, a new and effective technique for isolating the components of the water-soluble aqueous products has been devised, as described in my copending application, Serial No. 748,295, filed May 15, 1947; but the recovery of the oil-soluble oxygenated products on a large scale has been considered virtually impossible, and serious consideration has been given to the conversion or destruction of these compounds by means of solid catalysts at high temperatures to produce a liquid hydrocarbon product suitable for use as a motor fuel. Now, however, I have devised a unique, surprisingly simple, and effective technique, involving successive extractions, by which I am able to isolate a remarkably high proportion of the oil-soluble oxygenated products.

One object of my invention is to provide a method for separating and purifying mixtures of organic oxygenated compounds from mixtures comprised thereof. Another object of my invention is to provide a method for segregating mixtures of organic liquids comprising organic oxygenated compounds into generically dissimilar groups of compounds. A further object of my invention is to provide a process for recovering organic oxygenated compounds, such as alcohols, aldehydes, ketones, carboxylic acids, and phenolic compounds, from hydrocarbon solutions thereof, and in particular from hydrocarbon solutions resulting from the oxidation of hydrocarbon gases, or from the hydrogenation of oxides of carbon, in particular carbon monoxide. Another object of my invention is to produce a hydrocarbon product relatively free of oxygenated compounds. A still further object is to produce a motor fuel of relatively good odor and of improved stability with respect to antiknock rating. Other objects of my invention, and its advantages over the prior art, will be apparent from the following description.

The term "generically dissimlar groups of compounds" occurring herein is to be understood as meaning groups having dissimilar chemical properties. Under this definition, alcohols and phenols are generically dissimilar groups; and ketones, aldehydes, and carboxylic acids are others.

The development of my process arose out of my unexpected discovery that alcohols can be separated from organic solutions thereof by extraction with an aqueous solution immiscible therewith comprising one or more bisulfite addition products (adducts) of aldehydes and/or ketones, and further that alcohols, aldehydes, and ketones can be removed simultaneously from organic solutions by extraction with an aqueous solution of a mixture of a water-soluble bisulfite and bisulfite addition products of aldehydes and/or ketones. Moreover, I also observed that the alcohols can be selectively separated from the resulting extract, containing alcohols and the bisulfite addition compounds of aldehydes and/or ketones, by extraction with a water-immiscible solvent, after which the aldehydes and ketones remaining in the alcohol-depleted extract can be regenerated and removed, for example, by steam distillation, by addition of an alkaline material or a strong acid, or by subjecting the extract to a differential heat treatment, as disclosed in U. S. Patent 2,457,257.

On the basis of this discovery, I am now able to make a substantially complete segregation of, for example, a hydrocarbon solution containing alcohols, aldehydes, ketones, carboxylic acids, and phenolic compounds by a process which may include the following steps:

1. Extraction of alcohols, aldehydes, and ketones from the hydrocarbon solution by use of an aqueous extractant solution comprising a water-soluble bisulfite and one or more addition products of a water-soluble bisulfite with aldehydes and/or ketones.

1a. Alternatively, the hydrocarbon solution may be extracted simply with an aqueous solution of a water-soluble bisulfite. Bisulfite-carbonyl compounds are first formed and are extracted into the aqueous phase; the adducts then effect the extraction of alcohols into the aqueous phase.

2. Separation of alcohols from the resulting extract by extracting with a selective solvent, such as a light hydrocarbon, an ester, or an aliphatic ether.

3. Steam distillation of the aqueous raffinate to regenerate and separate the aldehydes and ketones contained therein.

3a. Or alternatively, addition of a strong acid or an alkaline material to the alcohol-depleted extract to break down the bisulfite addition products and release the aldehydes and ketones.

4. Extraction of the hydrocarbon raffinate from step 1 with an aqueous solution of a mild alkali, such as sodium carbonate, to separate carboxylic acids.

4a. Alternatively, all of the organic acids, both carboxylic acids and phenolic compounds, may be extracted concurrently with an aqueous caustic solution.

5. Extraction of the hydrocarbon raffinate from step 4 with an aqueous caustic solution, such an aqueous sodium hydroxide, to separate phenolic compounds.

My process is suitable for separating alcohols from solution in virtually any organic liquid that is not completely miscible with aqueous bisulfite solutions and that is compatible with bisulfite adducts in the sense that it does not react substantially with or have any substantial tendency to destroy aldehyde-bisulfite and ketone-bisulfite addition compounds. Among such organic liquids may be cited aliphatic hydrocarbons in general, such as pentanes, pentenes, hexanes, hexenes, heptanes, heptenes, octanes, octenes, petroleum naphthas, and the like; alicyclic hydrocarbons, such as cyclohexane, cyclohexene, cyclopentane, methylcyclopentane, and the like; aromatic hydrocarbons, such as benzene, toluene, xylene, and the like; ethers, such as ethyl ether, isopropyl ether, butyl ether, ethyl butyl ether, and the like; and aldehydes and ketones in general, such as the group set forth above.

Water-soluble bisulfites in general are suitable for use in steps 1 and 1a of my process, including bisulfites of alkali metals, specifically lithium, sodium, potassium, rubidium, and cesium; alkaline-earth metals, such as calcium, barium, and strontium; and ammonium and substituted ammoniums, such as methylammonium, diethylammonium, tris(2 - hydroxyethyl)ammonium, benzyltrimethylammonium, and the like; but owing to the lower cost and greater availability of potassium and sodium bisulfites, I ordinarily choose to use the latter two.

In step 1, the extraction should be carried out within the pH range in which the bisulfite addition compounds with aldehydes and/or ketones are stable, ordinarily between about pH 2.2 and 8, and preferably between about pH 5 and 8. For this reason, the pH of the stream of extractant supplied to the extraction column in step 1 should be adjusted as required by addition of an alkaline material, such as sodium hydroxide, or an acidic material, preferably sulfur dioxide or sulfurous acid, or a buffering agent, such as an acid sodium phosphate.

For the most effective extraction of aldehydes and ketones from the organic phase in step 1, the aqueous bisulfite extracting solution contacting each increment of the organic phase should contain a quantity of free bisulfite at least equivalent to the aldehydes and ketones in the organic-phase increment. Preferably, however, the free bisulfite should be present in at least slight excess, and I have found that 50 to 100% excess or more may be employed advantageously to speed up the extraction and to reduce the size of equipment required.

The aqueous bisulfite extracting solution employed in step 1 may suitably contain a total bisulfite concentration, including both free and bound bisulfite, between about 3 and 25 weight percent, calculated as the anhydrous bisulfite salt, and preferably between about 10 and 15 weight percent. Excessively high concentrations are difficult to work with, owing to their tendency to cause crystallization or gelling during the extraction step. On the other hand, very low concentrations would make it necessary to employ excessive volumes of extractant. For effective extraction of alcohols, the extractant solution should contain between about 7 and 20 weight percent of ketone-bisulfite and/or aldehyde-bisulfite adducts, and preferably between about 10 and 15 weight percent. The adducts may be added to the extractant stream entering the extractor, or they may be formed in situ (step 1a) by reaction between free bisulfite and ketones and/or aldehydes. The concentration of adducts is not critical, and may be varied somewhat, depending on the quantity of alcohols to be extracted, the temperature of extraction, and the permissible quantity of non-alcoholic contaminants in the extract.

The step 1 extraction may be carried out satisfactorily at temperatures as low as 0° C. or somewhat below, the lower limit being the temperature at which freezing of the solution or precipitation of solids therefrom takes place. The upper temperature limit varies somewhat, depending on the ketone content of the organic solution and of the aqueous extractant solution. Ketone-bisulfite addition products become increasingly unstable at temperatures above about 40° C. For satisfactory removal of ketones from the organic phase, therefore, the extraction temperature should not be substantially above about 40° C. On the other hand, aldehyde-bisulfite adducts are stable at much higher temperatures, and are capable of solubilizing alcohols satisfactorily at 50° C. and somewhat higher. In the absence of ketones, or when it is not desired to extract all of the ketones present, temperatures up to around 50° C. may be employed.

In the step 1 extraction, the aldehydes and ketones in the organic phase react with the bisulfite, giving a product which transfers readily into the aqueous phase; and the aldehyde-bisulfite and/or ketone-bisulfite adducts act as solubilizers for the alcohols, causing them also to transfer from the organic phase into the aqueous phase. This solubilizing effect depends, to some extent, on the molecular weight of the aldehydes and ketones in the addition compound. Bisulfite addition products of aldehydes and ketones having a distribution of molecular weights similar to the distribution of molecular weights in the alcohols have been found to be most desirable. Preferably, therefore, means should be provided, as detailed in Example III below, for recycling a portion of the adduct streams from various points in my process, and for recycling bisulfite solution, regenerated, for example, by steam distillation or by heat treatment as disclosed in my copending joint application with Walker, referred to above. I have also found it advantageous to incorporate a limited quantity, suitably up to about 10%, of a lower aliphatic alcohol, such as ethanol or methanol, or a quantity of a hydrophilic ester, such as ethyl acetate or butyl acetate, in the bisulfite-adduct extractant solution used in step 1, in order to reduce the tendency of the adducts to precipitate and to permit the use of higher concentrations of adducts. To this end, I may also recycle a portion of the step 1 extract directly to the step 1 extractant.

The term "hydrophilic ester" is to be understood as referring to esters having a solubility in water greater than about 1% by weight.

The aqueous extract from step 1 contains aldehydes and/or ketones in chemical combination and alcohols in solution. The alcohols may be removed selectively by extracting the solution with a solvent that is immiscible therewith (step 2). Light hydrocarbons, such as propane, butanes, pentanes, hexanes, and the like; esters, such as ethyl acetate, butyl acetate, methyl butyrate, and the like; and aliphatic ethers, such as ethyl ether, n-propyl ether, isopropyl ether, n-butyl ether, isoamyl ether, and the like, are particularly suitable for this extraction.

The steam distillation (step 3) to regenerate and separate aldehydes and ketones from the alcohol-depleted aqueous solution resulting from step 2 should ordinarily be carried out at 80° C. or above to accelerate the release of the aldehydes from the comparatively stable aldehyde-bisulfite adducts. Alternatively, I may heat the alcohol-depleted aqueous solution from step 2 and extract the released ketones and aldehydes therefrom at around 80° C. or above, using solvents such as those employed in step 2, and operating in pressure equipment if necessary to avoid volatilization losses.

Subsequent processing of the various fractions produced in the above steps may be carried out according to methods known in the art. Specifically, the extract obtained in step 2 may be stripped free from solvent and then subjected to fractional distillation, azeotropic distillation, and/or extractive distillation to separate the individual components of the residual alcohol mixture. Similar distillation techniques are also suitable for separating the aldehyde and ketone mixture obtained in step 3 or 3a, and for further purifying the several hydrocarbon raffinate streams from various steps in the process, containing diminished proportions of oxygenated compounds. The hydrocarbon raffinate streams may alternatively or additionally be contacted with silica gel, activated alumina, or other adsorption agents to remove substantially all oxygenated compounds therefrom. The aqueous solution of carboxylic acid salts resulting from step 4 may be treated with a strong acid such as sulfuric acid to regenerate the carboxylic acids, and the acids may then be further processed, as by fractional distillation. The same procedure is suitable for further processing the aqueous solution of phenolates resulting from step 5.

My invention will be more fully undertood from the following specific examples:

EXAMPLE I

One hundred parts by volume of a heptane solution of n-heptyl alcohol containing 0.402 gram-mole of the alcohol per liter, as analyzed by the Grignard method, were shaken fifteen minutes at 40–45° C. with 100 parts by volume of an aqueous 20% heptaldehyde-bisulfite adduct solution, prepared by mixing 105 parts by weight of heptaldehyde, 112 parts by weight of sodium bisulfite, and 798 parts by weight of water. The phases were then separated and analyzed. The aqueous layer measured 102 parts by volume and contained 0.210 gram-mole of n-heptyl alcohol per liter, corresponding to 53.2 percent of the alcohol originally present in the heptane solution.

Subsequently, the aqueous layer was agitated 15 minutes at 40–45° C. with 100 parts by volume of alcohol-free heptane, and the phases were separated and analyzed. The heptane layer measured 101 parts by volume and contained 0.0730 gram-mole of n-heptyl alcohol per liter, corresponding to 34.5 percent of the n-heptyl alcohol in the aqueous layer prior to extraction with heptane.

EXAMPLE II

A hydrocarbon phase resulting from the hydrogenation of carbon monoxide over a fluidized-iron catalyst, as described above, was washed successively with water to remove water-soluble organic oxygenated compounds and with dilute aqueous sodium carbonate solution to remove organic acids. The resulting washed hydrocarbon phase contained a mixture of oil-soluble aldehydes and ketones, together with 1.237 gram-moles per liter of mixed alcohols, as determined by the Grignard method.

One hundred parts by volume of the washed hydrocarbon phase were agitated fifteen minutes at 40–45° C. with 100 parts by volume of an aqueous 20% heptaldehyde-bisulfite adduct solution, prepared as described in Example I, and the phases were separated and analyzed. The aqueous layer measured 105 parts by volume and contained 0.785 gram-mole of alcohols per liter, corresponding to 66.6 percent of the alcohols present in the washed hydrocarbon phase.

EXAMPLE III

The following example illustrates the application of my invention to the treatment of the hydrocarbon phase resulting from the hydrogenation of carbon monoxide by a process in which the catalyst and reaction conditions are chosen to yield a high conversion to organic oxygenated compounds, as defined above.

In a preliminary operation, the stream of product vapors resulting from the hydrogenation of carbon monoxide is condensed at least partially and separated into a gas stream, an oil stream, and a water stream. A convenient method for carrying out this separation is illustrated in Figure 1:

The product vapor stream flows through line 1 into heat interchanger 2, where the normally liquid constituents are condensed partially or completely, and the resulting mixture of gases, oil, and water flows through line 3 into knockout drum 4. The gas stream emerges from the latter through line 5, and is successively passed upward through scrubbers 6 and 9. The liquids from the knockout drum flow through line 13 into separator 14, where the phases are permitted to separate. The separator is vented to gas line 5 through line 15.

Into the top of scrubber 6, a stream of water may be introduced through line 7. Preferably, however, a dilute aqueous solution of water-soluble fatty acids, such as the bottom stream obtained in topping the aqueous phase from separator 14, is fed into the top of scrubber 6. Substantially all of the water-soluble oxygenated compounds are removed from the gas stream in scrubber 6. Into the top of scrubber 9 is introduced a lean oil through line 11, suitably a portion of a hydrocarbon stream that has been partially or completely denuded of oxygenated compounds in a later stage of my process. Scrubber 9 may be by-passed by valve 10 if desired. The scrubbed gases, now virtually entirely free of oxygenated compounds, emerge from the top of scrubber 9 through line 12, and may be returned to process or otherwise disposed of.

By regulating the temperature within separator 14, the distribution of oxygenated compounds between the oil and water phases may conveniently be controlled as desired. I have observed that the higher the temperature within separator 14, the lower the concentration of oxygenated compounds in the aqueous phase.

The oil phase from separator 14 is withdrawn through line 16 and combined with the bottoms emerging from scrubber 9 through line 17, and the mixture is passed through line 18 into the bottom of washer 19. The aqueous bottoms emerging from scrubber 6 through line 20 are introduced into washer 19 at an intermediate point, and into the top of washer 19 is introduced a stream of fresh water through line 21. As the oil stream rises through washer 19, it is therefore scrubbed successively with a dilute aqueous solution of oxygenated compounds and then with fresh water. Substantially all of the water-soluble oxygenated compounds are thereby removed from the oil stream, which emerges through line 22 and is then further treated according to the process of my invention, in order to segregate oil-soluble oxygenated compounds therefrom.

The water stream from separator 14 is withdrawn through line 24a and mixed with the aqueous bottoms emerging from washer 19 through line 23a. The aqueous mixture flows through line 21a to further processing steps, as described in my co-pending application, S. N. 748,295, filed May 15, 1947.

Such further processing as disclosed in said co-pending application may be substantially as follows. The water stream from separator 14 is withdrawn through line 24a and mixed with the aqueous bottoms emerging from washer 19 through line 23a. The aqueous mixture is transferred by pump 26a through line 27a, heater 28a and line 29a into fractionating column 30a, equipped with reboiler 31a. Column 30a is operated at a reflux ratio around 40:1, and the top temperature is maintained below about 175° F. by suitable adjustment of the feed and bottom temperature. Under these conditions, distillation of a water stream containing 11 per cent distillables other than organic acids gave the following results:

| Overhead vapor temperature, °F. | Acidity of overhead, percent as acetic | Nonacidic distillables in bottoms, ml./gal. |
| --- | --- | --- |
| 172 | 0.02 | 2.3 |
| 176 | 0.16 | 0.3 |
| 180 | 0.56 | 0.1 |
| 184 | 0.84 | 0.0 |

From the top of the fractionating column, vapors pass into condenser 32a and the condensate, comprising primarily alcohols, aldehydes, ketones and water flows into reflux bottle 33a. Part of the condensate is refluxed to the top of column 30 through valve 34a and the remainder is taken off through valve 35a, pump 36a and line 37a. The bottom stream from fractionator 30a contains acids, while, as shown in the above table, the acidity of the overhead is relatively negligible.

The alcohol, aldehyde and ketone stream in line 37a is introduced into fractionating column A, equipped with reboiler 114a. A bottom stream comprising water, n-butyl alcohol and high boilers is removed from the bottom of column A. The overhead from column A comprising n-butyl alcohol and lower boilers passes through condenser 111a into receiver 112a and out through valve 113a where the stream is divided, part of it being refluxed to column A and the remainder passing into column B, equipped with reboiler 134a, for further fractionation. From the bottom of column B, a stream comprising butyraldehyde and higher boilers is withdrawn. From the top of column B, a stream comprising mainly methanol, acetone and lower boilers is withdrawn through condenser 121a into receiver 122a and out through valve 123a where the stream is divided, part of it being refluxed to column B. The lower boilers withdrawn in this manner include acetaldehyde and propionaldehyde. The condensed stream from the top of column B may be redistilled in further columns (not shown) to separate acetaldehyde and propionaldehyde, respectively, from other nonacidic components, such as acetone and methanol. Thus, aldehydes boiling not higher than propionaldehyde are separated from nonacidic components, such as butyraldehyde and ethyl methyl ketone, in column B.

Figure 2:
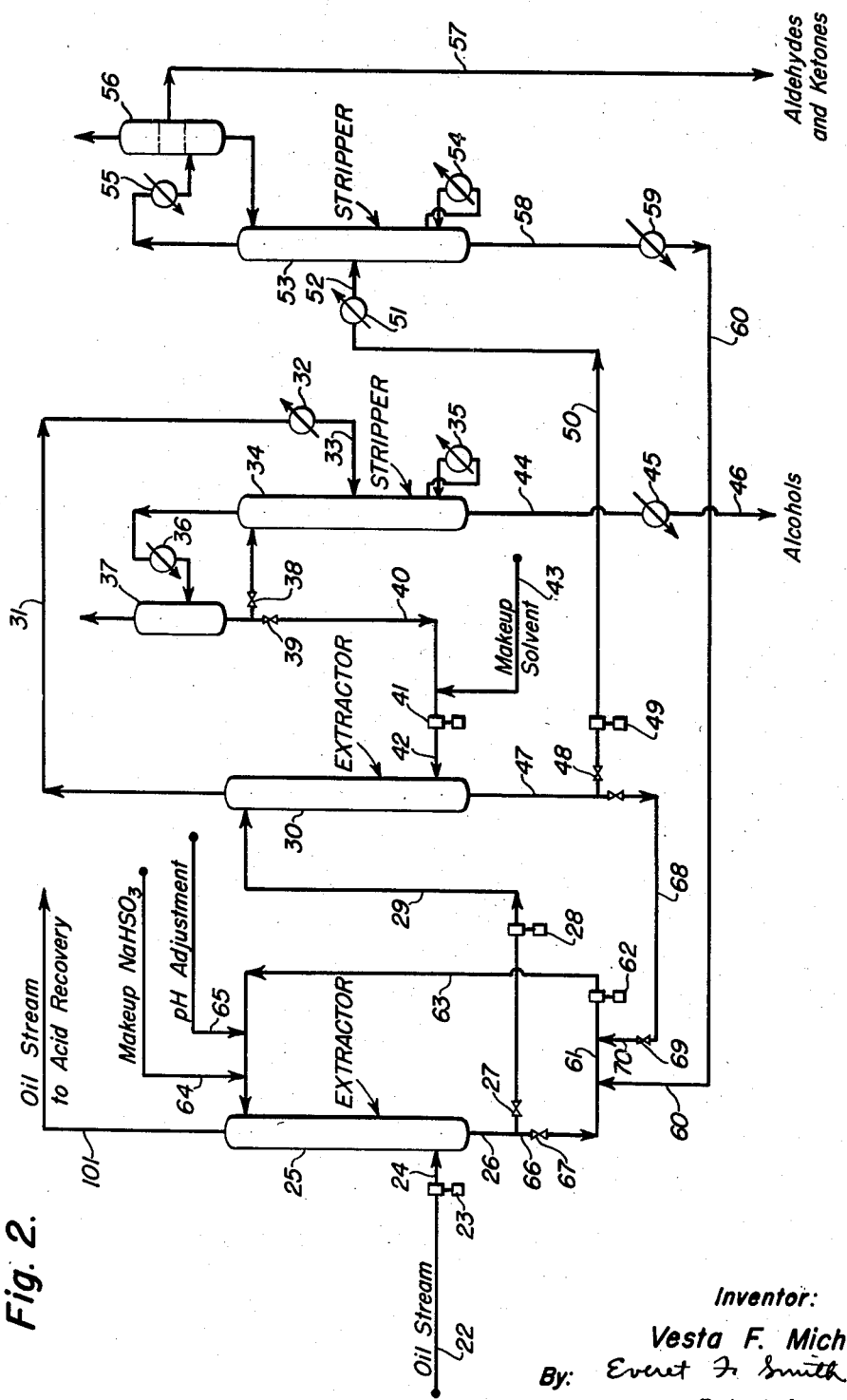

The hydrocarbon stream from washer 19 (Figure 1) flows through line 22 into pump 23 (Figure 2), and from there through line 24 into extractor 25, where it rises countercurrent to a downward-flowing aqueous solution of sodium bisulfite and bisulfite addition products of aldehydes and ketones at a temperature around 20° C. The free sodium bisulfite adds to the aldehydes and ketones, giving products which are transferred into the aqueous phase; and the bisulfite addition compounds act as solubilizers for the alcohols, permitting them also to be transferred into the aqueous phase.

The aqueous extract emerges from the bottom of extractor 25 through line 26 and valve 27, and is transferred by pump 28 through line 29 into the top of extractor 30, in which it flows downward counter-current to a stream of pentane at a temperature around 20° C. The alcohols are thereby selectively extracted from the aqueous stream. The pentane extract emerging from the top of extractor 30 flows through line 31, heater 32 and line 33 into an intermediate point of stripper 34. Heat is supplied to the stripper by reboiler 35. The pentane is taken off overhead through condenser 36 to separator 37, from which a portion is refluxed to the stripper through valve 38, and the remainder is recycled through valve 39, line 40, pump 41, and line 42 to the bottom of extractor 30, makeup solvent being added as required through line 43 ahead of pump 41. A mixture of alcohols is withdrawn from the bottom of stripper 34 through line 44 and cooler 45, and is transferred through line 46 to storage or to further processing.

The alcohol-depleted solution of bisulfite addition products flowing from the bottom of extractor 30 passes through line 47 and valve 48 into pump 49, by which it is transferred through line 50 into heater 51. Therein, the stream is heated to a temperature of about 80° C. or above, and is discharged through line 52 into stripper 53, equipped with reboiler 54. In the stripper, the aldehydes and ketones are released from combination with the bisulfite, and are taken off overhead in admixture with water vapors through condenser 55 into separator 56. The aqueous phase from separator 56 is refluxed to stripper 53, and the water-insoluble phase, comprising primarily aldehydes and ketones, is withdrawn through line 57 to storage or further processing, by fractional distillation, for example.

A stream of regenerated bisulfite solution emerges from the bottom of stripper 53 through line 58 and cooler 59, and is recycled to extractor 25 through line 60, line 61, pump 62, and line 63. Makeup bisulfide is added to the recycled stream as required through line 64, and the pH of the bisulfite stream is adjusted, preferably to between 5 and 8, by addition of sodium hydroxide or sulfurous acid through line 65.

The ketone and aldehyde bisulfite adducts that are required to solubilize the alcohols in extractor 25 are supplied to the regenerated bisulfite solution entering the top of the extractor through line 63 by adding thereto portions of other streams from various points in the process. A portion of the stream emerging from extractor 25 through line 26, containing the desired adducts, plus free bisulfites and alcohols, may thus be withdrawn through line 66 and valve 67 and introduced through line 61 into pump 62. Similarly, a portion of the bottoms emerging from extractor 30 through line 47, containing the desired adducts and free bisulfite, may be withdrawn through line 68 and valve 69 and recycled by way of line 70, line 61 and pump 62. By suitably regulating the proportions of these various recycle streams, an aqueous extract solution of the desired composition may be supplied to the top of extractor 25.

Hydrocarbons from the top of extractor 25 flow through line 101 (Figure 2) into pump 102 (Figure 3), and are transferred thereby through line 103 into the bottom of extractor 104, where they flow upward countercurrent to a downward-flowing aqueous 7 percent sodium carbonate solution, introduced through line 105. In this extractor, sodium salts of the carboxylic acids are formed, and are dissolved in the water phase. The aqueous solution flows from the bottom of extractor 104 through line 106, pump 107, line 108, heater 109, and line 110 into stripper 111 at an intermediate point. Dissolved hydrocarbons are stripped out of the solution by reboiler 112 and are taken overhead in admixture with water vapor through condenser 113 into separator 114, from which the aqueous phase is recycled to the stripper and the hydrocarbon phase is withdrawn through pump 115 and line 116 and combined with the hydrocarbon stream issuing from the top of extractor 104 through line 117. The stripped water solution from stripper 111 is withdrawn through line 118, cooler 119, and line 120, and is then acidified, preferably with sulfuric acid, added through line 121. The acidified mixture flows into an agitated reaction vessel 122, where it is cooled by a stream of cold water 123 flowing through jacket 124. Carbon dioxide produced by the acidification is allowed to escape through vent line 125. The acidified liquid flows from the bottom of reactor 122 through seal line 126 into knockout drum 127, where any remaining gases are separated and vented through line 128. From the bottom of knockout drum 127, the liquid emerges through line 129 and is transferred by pump 130 through line 131 into extractor 132 at an intermediate point. Into the bottom of the extractor is introduced through line 133 a solvent for fatty acids, which flows upward through the downward-flowing aqueous stream and extracts the fatty acids therefrom. Suitable solvents are aliphatic ethers, such as isopropyl ether, butyl ether, and the like; aromatic hydrocarbons, such as benzene, toluene, and the like; esters, such as ethyl acetate, butyl acetate, methyl butyrate, and the like; and high-boiling wood-oil fractions. Through line 134 at the top of the column is introduced a stream of fresh water, which washes any entrained or dissolved inorganic acid from the extract. The washed extract, comprising solvent and fatty acids, emerges through line 135 at the top of extractor 132, and is sent to storage or to further processing to isolate the various components of the mixture. The exhausted aqueous stream emerging through line 136 at the bottom of extractor 132 is discarded.

The hydrocarbon streams in lines 116 and 117, containing small proportions of phenolic compounds, are combined in line 137, and are transferred by pump 138 through line 139 into extractor 140, where they flow upward countercurrent to a downward-flowing aqueous 10 percent sodium hydroxide solution, introduced through line 141. In this extractor, sodium phenolates are formed, and are dissolved in the water phase. The aqueous solution flows from the bottom of extractor 140 through line 142, pump 143, line 144, heater 145, and line 146 into stripper 147 at an intermediate point. Dissolved hydrocarbons are stripped out of the solution by reboiler 148 and are taken overhead in admixture with water vapor through condenser 149 into separator 150, from which the aqueous phase is recycled to the stripper and the hydrocarbon phase is withdrawn through line 151 and combined with the hydrocarbon stream issuing from the top of extractor 140 through line 152.

The combined hydrocarbon streams, now containing only minor proportions of oxygenated compounds, flow through line 153 into pump 154, and are transferred thereby through line 155 into the bottom of washer 156. The hydrocarbons pass upward through the washer countercurrent to a stream of water, introduced at the top through line 157, which scrubs out any dissolved or entrained caustic material. The wash water from the bottom of the washer is discarded through line 158. The hydrocarbons emerge from the top of the washer through line 159, and are sent to storage or to further treatment, such as fractional distillation.

The stripped water solution from stripper 147 is withdrawn through line 160, cooler 161, and line 162, and is then acidified, preferably with sulfuric acid, added through line 163. The acidified mixture flows into an agitated reaction vessel 164, where it is cooled by a stream of cold water 165 flowing through jacket 166. The reaction vessel is vented through line 167. The acidified liquid flows from the bottom of reactor 164 through seal line 168 into knockout drum 169, where any entrained gases are separated and vented through line 170. From the bottom of knockout drum 169, the liquid emerges through line 171 and is transferred by pump 172 through line 173 into extractor 174 at an intermediate point. Into the bottom of the extractor is introduced through line 175 a solvent for phenolic compounds, which flows upward through the downward-flowing aqueous stream and extracts the phenolic compounds therefrom. Suitable solvents are aromatic, naphthenic, and saturated aliphatic hydrocarbons, such as benzene, toluene, cyclohexane, methylcyclopentane, hexanes, and octanes. Through line 176 at the top of the column is introduced a stream of fresh water, which washes any entrained or dissolved inorganic acid from the extract. The washed extract, comprising solvent and phenolic compounds, emerges through line 177 at the top of extractor 174, and is sent to storage or to further processing to isolate the various components of the mixture. The exhausted aqueous stream emerging through line 178 at the bottom of extractor 174 is discarded.

While the foregoing examples illustrate the preferred forms of my invention, it will be understood that departures may be made therefrom within the scope of the specification and claims. In general, it can be said that any modifications or equivalents that would ordinarily occur to those skilled in the art are to be considered as lying within the scope of my invention.

In accordance with the foregoing specification, I claim as my invention:

1. In a process for separating and recovering generically dissimilar groups of organic oxygenated compounds from a hydrocarbon solution containing an oil-soluble carboxylic acid and comprising a preferentially oil-soluble alcohol and at least one carbonyl compound selected from the group consisting of aldehydes and ketones, the steps which comprise extracting said hydrocarbon solution with an aqueous extractant solution comprising an alkali-metal bisulfite and a solubilizer for said preferentially oil-soluble alcohol consisting essentially of a bisulfite addition product of a carbonyl compound selected from the group consisting of aldehydes and ketones at a pH of from about 2.2 to 8.0; separating said preferentially oil-soluble alcohol from the resulting aqueous extract; heating at least a portion of the alcohol-depleted aqueous extract above the decomposition temperature of the bisulfite addition products contained therein; and withdrawing and recovering at least a portion of the carbonyl compounds regenerated thereby.

2. In a process for separating and recovering generically dissimilar groups of organic oxygenated compounds from a hydrocarbon solution containing an oil-soluble carboxylic acid and comprising a preferentially oil-soluble alcohol and at least one carbonyl compound selected from the group consisting of aldehydes and ketones, the steps which comprise extracting said hydrocarbon solution with an aqueous extractant solution comprising an alkali-metal bisulfite and a solubilizer for said preferentially oil-soluble alcohol consisting essentially of a bisulfite addition product of a carbonyl compound selected from the group consisting of aldehydes and ketones at a pH of from about 2.2 to 8.0; separating said preferentially oil-soluble alcohol from the resulting aqueous extract; heating at least a portion of the alcohol-depleted aqueous extract above the decomposition temperature of the bisulfite addition products contained therein; withdrawing and recovering at least a portion of the carbonyl compounds regenerated thereby; and recycling the depleted aqueous solution to the initial extraction step.

3. In a process for separating a preferentially oil-soluble alcohol from a hydrocarbon solution thereof containing water-soluble oxygenated compounds including oil-soluble carboxylic acids, the steps which comprise washing said hydrocarbon solution with water to remove said water-soluble oxygenated compounds therefrom, thereafter contacting the resulting water-washed hydrocarbon solution containing said preferentially oil-soluble alcohol at a pH of from about 2.2 to 8.0 with an aqueous extractant solution immiscible therewith containing a solubilizer for said preferentially oil-soluble alcohol consisting essentially of an addition compound formed from a water-soluble bisulfite and a carbonyl compound selected from the group consisting of aldehydes and ketones, allowing the resulting mixture to stratify into an oil and an aqueous layer, and thereafter withdrawing the aqueous layer containing said preferentially oil-soluble alcohol and removing said oil-soluble alcohol from the resulting aqueous extract by extracting the latter with a selective solvent for said oil-soluble alcohol.

4. In a process for separating a preferentially oil-soluble alcohol from a hydrocarbon solution thereof containiing oil-soluble carboxylic acids and at least one carbonyl compound selected from the group consisting of aldehydes and ketones, the steps which comprise washing said hydrocarbon solution with water, thereafter contacting the said water-washed hydrocarbon solution with an aqueous extractant solution immiscible therewith containing a water-soluble bisulfite at a pH of from about 2.2 to 8.0, stratifying and separating an aqueous extract containing said preferentially oil-soluble alcohol and bisulfite adduct of said carbonyl compound, thereafter removing said oil-soluble alcohol from said aqueous extract by extracting the latter with a selective solvent for said oil-soluble alcohol.

5. The process of claim 4 wherein the total bisulfite, both free and combined, present in said aqueous extractant solution is between about 3 and 25 weight per cent, calculated as the anhydrous bisulfite.

6. The process of claim 4 wherein said aqueous extractant solution comprises a water-soluble bisulfite and bisulfite addition products of carbonyl compounds selected from the group consisting of aldehydes and ketones, said carbonyl compounds having substantially the same composition with regard to identity and relative proportions as the carbonyl compounds in said hydrocarbon solution.

7. A method for separating water insoluble alcohols, aldehydes and ketones from a mixture containing them and hydrocarbons which comprises introducing said mixture into an extraction zone, contacting said mixture in said zone with an aqueous solution of a water-soluble bisulfite compound and of a water-soluble bisulfite adduct (1) formed from a carbonyl compound selected from the group consisting of aldehydes and ketones, withdrawing from said zone an aqueous extract containing said alcohols, bisulfite adduct (1) and bisulfite adduct (2) of the aldehydes and ketones in said mixture, thereafter countercurrently washing said extract with a relatively low-boiling hydrocarbon to form an extract phase comprising hydrocarbons and said water-insoluble alcohols and an aqueous raffinate phase comprising said bisulfite adducts (1) and (2), and thereafter withdrawing the phases thus produced from the zone of contact.

8. A method for separating water insoluble alcohols, aldehydes and ketones from a mixture containing them and hydrocarbons which comprises introducing said mixture into an extraction zone, contacting said mixture in said zone with an aqueous solution of a water-soluble bisulfite compound and of a water-soluble bisulfite adduct (1) formed from a carbonyl compound selected from the group consisting of aldehydes and ketones, withdrawing from said zone an aqueous extract of said alcohols, bisulfite adduct (1) and bisulfite adduct (2) of the aldehydes and ketones in said mixture, thereafter countercurrently contacting said extract in a separate extraction zone with a relatively low-boiling hydrocarbon to form an extract phase comprising hydrocarbons and water-insoluble alcohols and an aqueous raffinate phase comprising said bisulfite adducts (1) and (2), and thereafter withdrawing the phases thus produced from the zone of contact.

9. In a process for separating a preferentially oil-soluble alcohol from a hydrocarbon solution thereof containing water-soluble oxygenated compounds including oil-soluble carboxylic acids, the steps which comprise washing said hydrocarbon solution with water to remove said water-soluble oxygenated compounds therefrom, thereafter contacting the resulting water-washed hydrocarbon solution containing said preferentially oil-soluble alcohol at a pH of from about 2.2 to 8.0 with an aqueous extractant solution immiscible therewith containing a solubilizer for said preferentially oil-soluble alcohol consisting essentially of an addition compound formed from a water-soluble bisulfite and a carbonyl compound selected from the group consisting of aldehydes and ketones, allowing the resulting mixture to stratify into an oil and an aqueous layer, and thereafter withdrawing the aqueous layer containing said preferentially oil-soluble alcohol.

10. A method for separating a water-insoluble alcohol and at least one carbonyl compound selected from the group consisting of aldehydes and ketones from a mixture containing said at least one carbonyl compound, hydrocarbons and said water-insoluble alcohol, which comprises introducing said mixture into an extraction zone, contacting said mixture in said zone with a free water-soluble bisulfite compound and with an aqueous solution of a water-soluble bisulfite adduct (1) formed from a carbonyl compound selected from the group consisting of aldehydes and ketones, withdrawing from said zone an aqueous extract containing said alcohol, said bisulfite adduct (1) and a bisulfite adduct (2) of said at least one carbonyl compound, thereafter countercurrently washing said extract with a relatively low-boiling hydrocarbon to form an extract phase comprising hydrocarbons and said alcohol and an aqueous raffinate phase comprising said bisulfite adducts (1) and (2) and thereafter withdrawing the phases thus produced from the zone of contact.

VESTA F. MICHAEL.

REFERENCES CITED

The following references are of record in the file of this patent:

UNITED STATES PATENTS

| Number | Name | Date |
|---|---|---|
| 432,198 | Guignard | July 15, 1890 |
| 1,095,830 | Ekstrom | May 5, 1914 |
| 1,704,751 | Luther et al. | May 12, 1929 |
| 1,838,032 | Wiezevich et al. | Dec. 22, 1931 |
| 1,894,097 | James | Jan. 10, 1933 |
| 2,080,111 | Bump | May 11, 1937 |
| 2,274,750 | Soenksen et al. | Mar. 3, 1942 |
| 2,288,281 | Huijser et al. | June 30, 1942 |
| 2,505,752 | Burton | May 2, 1950 |
| 2,552,564 | King et al. | May 15, 1951 |

FOREIGN PATENTS

| Number | Country | Date |
|---|---|---|
| 472,545 | Great Britain | Sept. 23, 1937 |

OTHER REFERENCES

Fischer: "Conversion of Coal into Oils," pp. 241–246, published 1925 by Ernest Benn Ltd., London.

Fieser et al.: "Organic Chemistry," pp. 206–208. Copyright 1944 by D. C. Heath and Co., Boston.